United States Patent [19]
Treiber et al.

[11] Patent Number: 5,978,066
[45] Date of Patent: Nov. 2, 1999

[54] METHOD OF COPYING TRANSPARENT ORIGINALS AND PHOTOGRAPHIC COPIER

[75] Inventors: Helmut Treiber; Friedrich Jacob, both of München; Günter Findeis, Sauerlach, all of Germany

[73] Assignee: Agfa-Gevaert AG, Leverkusen, Germany

[21] Appl. No.: 08/944,127

[22] Filed: Oct. 6, 1997

[51] Int. Cl.[6] ............. G03B 27/52; G03B 27/32; G03B 27/72
[52] U.S. Cl. ............. 355/40; 355/27; 355/35
[58] Field of Search ............. 355/27, 32, 35, 355/38, 40, 41, 53, 68, 77; 348/362

[56] References Cited

U.S. PATENT DOCUMENTS

| | | | |
|---|---|---|---|
| 4,239,385 | 12/1980 | Hujer | 355/77 |
| 4,650,316 | 3/1987 | Matsumoto | 355/55 |
| 5,019,858 | 5/1991 | Suzuki | 355/35 |
| 5,155,524 | 10/1992 | Oberhardt et al. | 355/68 |
| 5,164,765 | 11/1992 | Strobel et al. | 355/38 |
| 5,239,341 | 8/1993 | Ishida et al. | 355/206 |
| 5,303,000 | 4/1994 | Benker et al. | 355/41 |
| 5,412,451 | 5/1995 | Suzuki | 355/68 |
| 5,638,153 | 6/1997 | Zahn et al. | 355/35 |
| 5,721,079 | 2/1998 | Goto | 430/22 |
| 5,850,281 | 12/1998 | Benker | 355/71 |

FOREIGN PATENT DOCUMENTS 41 02 593 A1 7/1992 Germany.

*Primary Examiner*—Safet Metjahic
*Assistant Examiner*—Hung Henry Nguyen
*Attorney, Agent, or Firm*—Darby & Darby

[57] ABSTRACT

Film frames are scanned preparatory to copying and a set of density values is generated for each frame. When a frame exhibits excessive contrast, a mask is calculated using the respective set of density values. The calculated mask is formed on an LCD or LED matrix which is in register with the frame. An image of the masked frame is then projected onto copy paper by a zoom objective. The mask has a size which is a function of the magnification factor and/or the mask-to-frame distance.

12 Claims, 1 Drawing Sheet

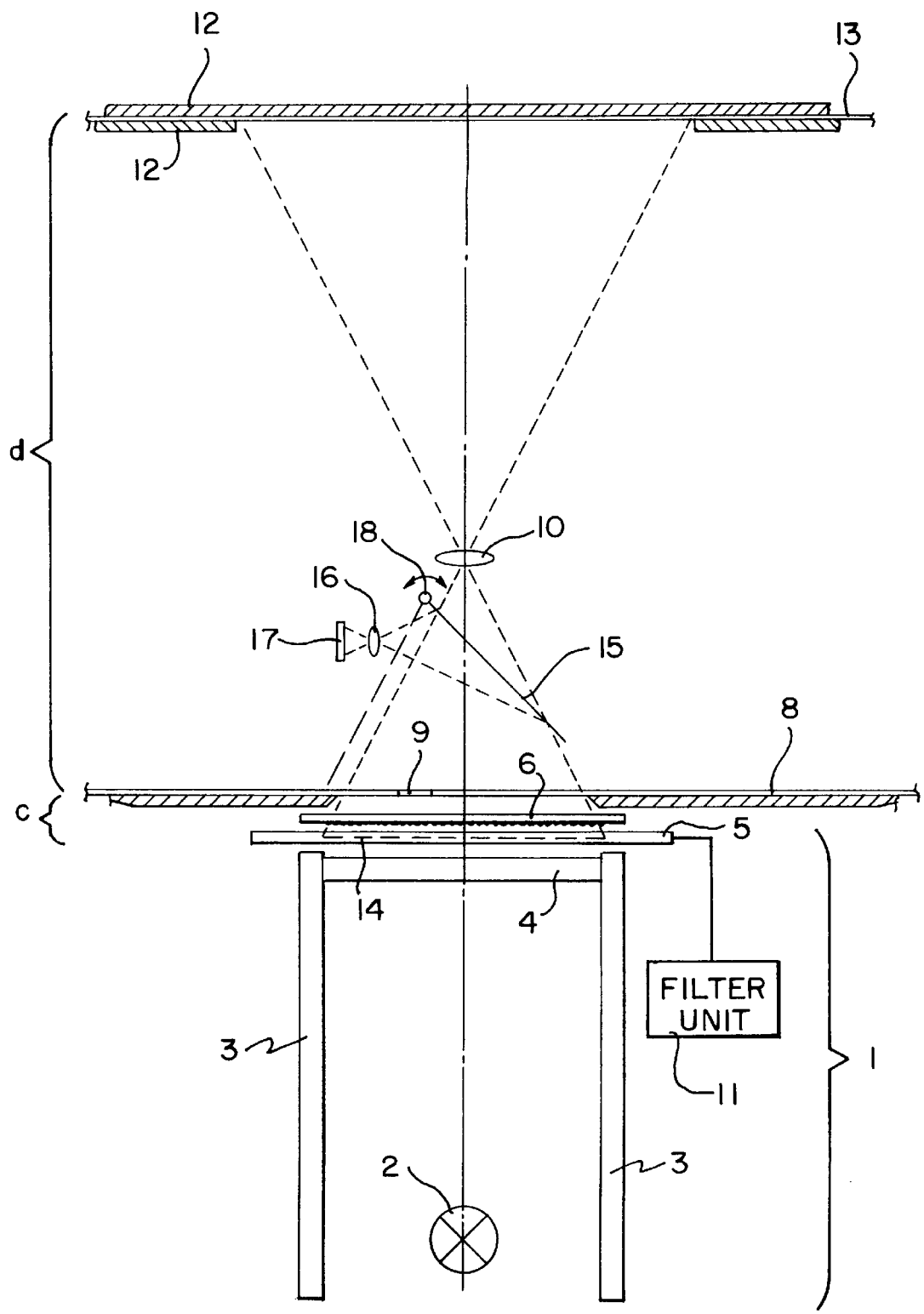

METHOD OF COPYING TRANSPARENT ORIGINALS AND PHOTOGRAPHIC COPIER

BACKGROUND OF THE INVENTION

The invention relates to a method of copying transparent masters and to a photographic copier.

Individual regions of photographic images often have large brightness variations so that finer structures are no longer observable in the darker regions. This is due to the small dynamic range of the photosensitive copy paper. In contrast, on the photographic film from which the paper copies are produced, the fine structures are also present in the darker regions because of the greater dynamic range.

U.S. Pat. No. 4,239,385 describes a copier in which the contrast between the light and dark regions is reduced to such an extent that the brightness gradations in the original can be adjusted to the dynamic range of the photosensitive copy paper. To this end, a liquid crystal display is placed between the light source and the photographic film. A black-and-white negative mask of the transparent original is generated in this display via an electric control unit. When exposure of the copy paper is now carried out via the mask an the original, a desired density compression is obtained.

In a similar apparatus shown by U.S. patent application Ser. No. 08/480,283, a mask representing a very blurry inverse image of the transparent original is produced in an LCD display. By virtue of this blurriness, only the so-called large area contrast is reduced which the contrast of details is maintained.

However, it has been surprisingly found that, even with this high degree of blurriness, the superposition of the mask and the original plays a large role. Since, under certain circumstances, the individual pixels of the LCD display become visible on the paper image, these are additionally blurred by a diffusing disk between the display and the transparent original. As a result, however, the distance between the mask and the original is small which negatively affects the quality of the paper images.

SUMMARY OF THE INVENTION

It was accordingly the object of the invention to design a method and an apparatus in such a manner that a precise superposition of the mask and the original is obtainable for originals of different size as well as for copy paper having different formats.

This object is achieved by providing for the size of the mask to be a function of the magnification factor and/or the mask-to-original distance. Fundamentally, there are two possibilities each of which takes into account the magnification factor of the objective. The first possibility is based on a constant distance between the original image and the generated mask. This means that the size of the mask should be changed when the magification factor of the objective, that is, the size of the copy, is changed. The magnification factor of the mask relative to the original image is thus calculated from the following equation:

$$Vmb=(c/d)(Vkb+1)+1$$

where:

Vmb is the magnification factor of the mask relative to the original image,

Vkb is the magnification factor of the copy (paper image) relative to the original image, c is the distance between the mask and the original image, d is the distance between the original image and the copy.

The second possibility is based on a constant magnification factor, Vmb, of the mask relative to the original image for different magnification factors, Vkb, of the objective. In this case, the distance, c, between the mask of the original image must vary with the magnification factor of the objective. This distance is calculated from the following equation:

$$c=d[(Vmb-1)/(Vkb+1)]$$

To permit automatic adjustment of the mask to the magnification of the objective in both cases, it is necessary—for example, when using a zoom objective—to know the position of the objective. The position can be determined by a sensor or, in the case of active control via stepper motors, can be stored in the control unit without a separate sensing of the position.

As is conventional in copiers, the illuminating arrangement can include a light source, a reflecting tube and a following diffusing disk. Below this diffusing disk is an LCD array whose zones can be controlled individually. An LED matrix which is directly controlled and requires no additional light source can be used instead of this arrangement, however.

To avoid possible visible images of structures of the LED matrix or the LCD array, a diffusing disk is inserted between the generated mask and the original image. Here, it is necessary to take into consideration that this increases the optical distance, as contrasted with the geometric distance, between the mask and the original image. Accordingly, an appropriately corrected value is to be used for the distance "c" in the preceding equations.

It has been found that, when ground diffusing disks are employed, color fringes occur in the generated images. This effect is due to the presence of scattering centers whose size is comparable to the wavelength of the light being used. It is thus more advantageous to use diffusing disks whose action is based not on the scattering but rather on the refraction of the light. Diffusing disks of this type have significantly coarser structures which act like a multiplicity of microscopic lenses and deflect light of different wavelengths to a similar degree. Such structures are to be found, for instance, in etched diffusing disks or overetched and ground diffusing disks.

Additional details and advantages of the invention are forthcoming from the following description of an exemplary embodiment with reference to the accompanying drawing.

BRIEF DESCRIPTION OF THE DRAWING

The sole FIGURE shows the optical path of a photographic copier according to the invention.

DESCRIPTION OF THE PREFERRED EMBODIMENTS

The copier has an illuminating arrangement 1 consisting of a light source 2, a reflecting tube 3, a diffusing disk 4 and an LCD matrix 5. An LED matrix can be provided instead of the LCD matrix 5 and makes the light source 2, the reflecting shaft 3 and the diffusing disk 4 superfluous.

Between the illuminating arrangement 1 and a film platform 7 is another diffusing disk 6 which is intended to prevent the formation of an observable image of the LCD or LED structure in the plane of the copy paper. A ground, overetched diffusing disk is advantageously used for this purpose.

The film platform 7 is designed to guide the film 8 with the individual original image 9. Also provided is an imaging objective 10 which projects the original image onto the copy paper 13. The imaging objective 10 is designed as a zoom objective to allow different combinations of copy paper format and film format.

During exposure, the copy paper is held flat by the paper platform 12.

A reflector 15 is pivotable into the optical path between the imaging objective 10 and the film platform 7 on a pivot 18. When pivoted inward, the individual original image 9 positioned on the film platform is projected onto the CCD sensor 17 by the objective 16. The latter is connected to the computer 11 by a non-illustrated conductor.

If now paper images or copies are to be prepared from a photographic film, the copier must first be provided with the format of the film to be copied. This can be accomplished automatically, for example, by insertion of the appropriate film platform or by way of a manual entry. The format of the desired paper images must then be set. This can also be accomplished automatically by insertion of an appropriate copy paper cassette or by way of a manual entry. Now the zoom objective 10 is adjusted, advantageously through the computer 11, via a stepper motor control unit. In this manner, the set magnification factor can be stored in the computer 11 even without sensing the position of the objective.

As soon as the first individual original image 9 of the film 8 to be copied is positioned on the film platform 7, the reflector 15 is pivoted into its full line position. Consequently, the individual original image is projected onto the CCD sensor 17 by the objective 16. The density values read out are sent to the computer 11. From the density values, the computer 11 determines control signals for the LCD matrix 6 to generate the mask 14. To achieve an exact superposition of the mask 14 and the individual original image 9, the mask must be slightly larger than the individual original image 9.

If now the magnification factor of the zoom objective 10 is changed due to a different film format or a different copy paper size, this circumstance is given appropriate consideration by the computer 11 during mask generation, and the magnification factor between the mask and the individual original image is changed.

It is also possible to maintain the mask size and, instead, to change the position of the mask in the optical path. However, since raising and lowering of the LCD display involves a high degree of technical complexity, only an exemplary embodiment with constant spacing between mask and individual original image is shown here.

The reflector 15 is now pivoted into its broken line position and the exposure carried out through the mask 14 and the individual original image 9. Subsequently, the next individual original image can be positioned and measured by the scanner 15–18, and the next mask generated by the computer 11.

We claim:

1. A photographic copier comprising
    a first holder for receiving a transparency;
    a scanner for determining density values of the transparency;
    a second holder for receiving photosensitive material;
    an imaging objective having variable magnification;
    an illuminating arrangement with a multiplicity of individually controllable zones;
    the first holder for receiving a transparency, the second holder for receiving the photosensitive material, the imaging objective and the illumination arrangement provide an optical bench;
    a control system is connected to the scanner and the illuminating arrangement, the control system is capable of transforming measured density values of the transparency such that the illuminating arrangement generates an unsharp mask of the transparency;
    the control system is additionally connected with the imaging objective and is designed such that the size of the unsharp mask is a function of the distance from the mask to the transparency and of the magnification of the objective.

2. The photographic copier according to claim 1, wherein the illuminating arrangement is separated from the first holder by a fixed distance.

3. The photographic copier according to claim 1, wherein the illuminating arrangement comprises an LCD matrix, a light source and a diffusing disk.

4. The photographic copier according to claim 3, wherein the diffusing disk refracts light.

5. The photographic copier according to claim 1, wherein the illuminating arrangement comprises an LED matrix.

6. The photographic copier according to claim 1, further comprising a diffusing disk disposed between the illuminating arrangement and the first holder.

7. The photographic copier according to claim 6, wherein diffusing disk is etched.

8. The photographic copier according to claim 1, wherein the scanning arrangement comprises an objective, a CCD sensor and a reflector, pivotal between two positions.

9. The photographic copier according to claim 8, wherein the first pivotal position of the reflector is in the optical bench and the second pivotal position of the reflector is outside of the optical bench.

10. The photographic copier according to claim 1, wherein the first holder is supplied with a film having individual images.

11. The photographic copier according to claim 1, wherein the second holder is supplied with photographic copying paper.

12. The photographic copier according to claim 1, wherein the first holder has a variable distance to the generated unsharp mask.

* * * * *

UNITED STATES PATENT AND TRADEMARK OFFICE
CERTIFICATE OF CORRECTION

PATENT NO. : 5,978,066
DATED : November 2, 1999
INVENTOR(S) : Helmut Treiber, Friedrich Jacob, Gunter Findeis, and Markus Fussel It is certified that error appears in the above-identified patent and that said Letters Patent is hereby corrected as shown below:

Title page, [75], Inventors:

After "Helmut Treiber; Friedrich Jacob, both of Munchen; Gunter Findeis, of Sauerlach", please add --Markus Füssel, of Munchen--.

Signed and Sealed this

Thirtieth Day of May, 2000

Attest:

Q. TODD DICKINSON

*Attesting Officer*     *Director of Patents and Trademarks*